G. A. LYON.
REINFORCED AUTOMOBILE BUFFER.
APPLICATION FILED JAN. 25, 1918.
1,325,732.
Patented Dec. 23, 1919.
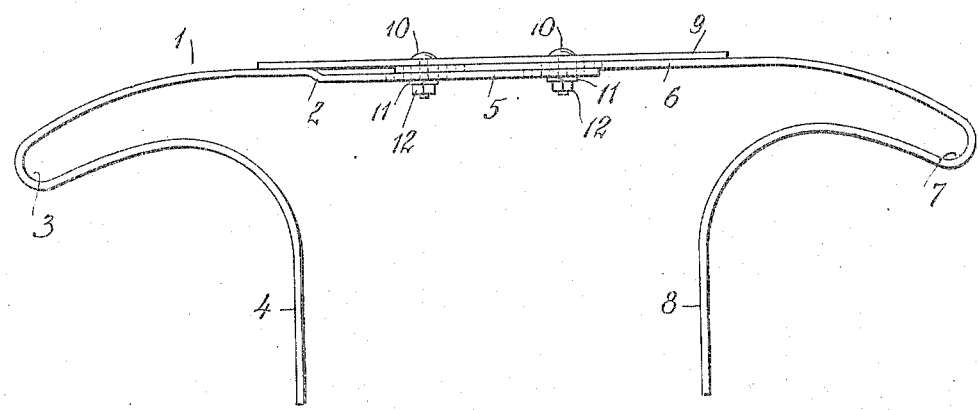
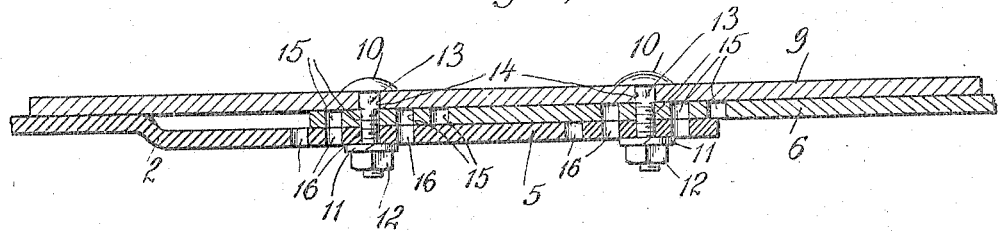
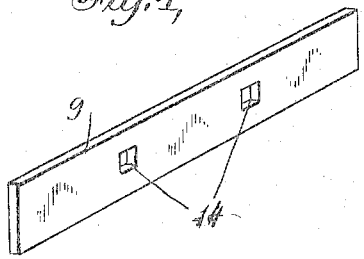
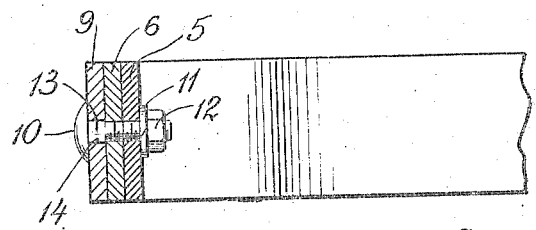
Inventor
George Albert Lyon
By his Attorney
Harry L. Duncan

UNITED STATES PATENT OFFICE.

GEORGE ALBERT LYON, OF PHILADELPHIA, PENNSYLVANIA.

REINFORCED AUTOMOBILE-BUFFER.

1,325,732.　　　　　　　Specification of Letters Patent.　　Patented Dec. 23, 1919.

Application filed January 25, 1918. Serial No. 213,718.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Reinforced Automobile-Buffers, of which the following is a specification, taken in connection with the accompanying drawings, which form a part of the same.

This invention relates to resilient automobile buffers of the general type covered by the Lyon Patent No. 1,198,246, of September 12, 1916. The buffer may comprise two resilient strips of spring steel having attaching members to be secured to the automobile frame or other parts of a vehicle and also having transversely extending impact receiving members and intermediate resilient curved portions such as open end loops. The impact receiving members are arranged to overlap adjacent the center of the buffer and one of them preferably has its end offset around the end of the other impact receiving member, so that, for instance, the front surface of the impact receiving members is thus brought into line and can have a closer and stronger connection with one or more resilient strip front reinforcing members which are preferably bolted thereto so as to form a multiple strength front portion of the buffer. The reinforcing member may be conveniently secured in place by forming therein bolt holes which may be more or less elongated, if desired, and through which may pass connecting bolts preferably having square or polygonal shanks to coöperate with similarly shaped holes in the reinforcing member. The coöperating overlapped portions of the impact receiving members are preferably formed with holes and when the buffer is to be laterally adjustable a series of such more or less elongated holes or slots may be formed in one or both of the impact receiving portions, so that the connecting bolts may extend through the proper holes and thus securely and adjustably connect the buffer elements together.

In the illustrative embodiment of the invention shown in the drawing—

Figure 1 is a top view of the device.

Fig. 2 is an enlarged sectional view of the front portion of the buffer.

Fig. 3 is a transverse section thereof taken through one of the connecting bolts; and Fig. 4 is a perspective view showing the reinforcing member in somewhat greater detail.

The buffer may be composed of a number of strips of resilient material, such as tempered spring steel, and these strips at least where they are subject to vertical bending forces, are preferably of considerably greater vertical width than thickness so as to make them vertically rigid while resiliently yielding to a much greater extent in horizontal directions. Two such strips are shown as having generally similar contour and comprising attaching members, and one strip may comprise the attaching member 8 and the transversely extending impact receiving member 6 which are connected by the interposed resilient open end loop 7 which is adapted to extend out more or less into protective position adjacent the automobile wheel. The other strip which may be of generally similar contour may comprise the attaching member 4 and the resilient end loop 3 and impact receiving member 1, the end 5 of this impact receiving member being preferably offset at about the point 2 so as to extend around the end of the other impact receiving member and thus bring one side of the two impact receiving members into line. A similar spring steel or other resilient strip reinforcing member 9 is preferably arranged in front of the overlapping impact receiving members and may be conveniently secured in this reinforcing position by suitable connecting bolts or similar devices.

The connecting bolts or devices 10 may as shown in Fig. 2 have the square or polygonal shanks 13 adapted to coöperate with similarly shaped holes 14 in the reinforcing member 9. The ends of these bolts may, of course, be threaded and where lateral adjustment of the buffer is desired several series of adjusting holes 15, 16 may be formed in the overlapping portions of the impact receiving members so that the connecting bolts may extend through any suitable holes and thus adjustably connect the buffer elements together, so that the lateral width of the buffer is adjusted together with the distance between its attaching members, so that it can properly coöperate with automobile frame members located at different distances apart. In making this adjustment it is usually desirable to bring the end of the impact receiving member 6 to the left, for instance, while the end 5 of the other impact receiving member is simultaneously moved to the right a corresponding number of holes if it is desired to keep the reinforcing member and connecting bolts in the center of the buffer front. By giving the heads of the connecting bolts 10 a pleasing convex shape these forwardly projecting portions are more or less ornamental and give the buffer a pleasing appearance from the front, especially if the reinforcing member and bolt heads are nickel-plated, for example. These connecting bolts which are preferably provided with lock washers 11 in connection with their nuts 12 serve to securely connect the overlapping triple thickness front portions of the buffer so that they mutually reinforce and strengthen each other and in this way also undesirable vertical relative movement of the parts is prevented and the vertical stiffness of the buffer correspondingly increased.

This invention has been described in connection with a number of illustrative forms, proportions, parts, arrangements, materials, methods of connection and use, to the details of which discloure the invention is not of course to be limited, since what is claimed as new and what is desired to be secured by Letters Patent is set forth in the appended claims.

I claim—

1. The automobile buffer comprising two integral spring steel strips having considerably greater vertical width than thickness to render them relatively rigid vertically while resiliently yielding in horizontal directions, each of said strips having a rearwardly extending attaching member to be attached to the automobile frame member and having an intermediate resilient loop formed with an open inner end and extending into protective position adjacent the automobile wheel and having a transversely extending impact receiving member, the impact receiving members of said strips overlapping adjacent the central part of the buffer and one of said impact receiving members having an offset and to bring its intermediate portion substantially into line with the end of the other impact receiving member, and a spring steel front reinforcing strip arranged in front of said impact receiving members and overlapping the same substantially throughout the distance between the side frames of the automobile, said reinforcing strip being formed with two holes, connecting bolts having shanks passing through said holes and series of adjusting holes in both of said impact receiving members through which said connecting bolts pass to adjust the width of said buffer to fit automobiles having frame members at different distances apart and to hold said impact receiving members and said reinforcing strip in close reinforcing coöperation and minimize relative vertical movement thereof.

2. The automobile buffer comprising two integral spring steel strips having considerably greater vertical width than thickness to render them relatively rigid vertically while resiliently yielding in horizontal directions, each of said strips having a rearwardly extending attaching member to be attached to the automobile frame member and having a transversely extending impact receiving member, the impact receiving members of said strips overlapping adjacent the central part of the buffer and one of said impact receiving members having an offset end to bring its intermediate portion substantially into line with the end of the other impact receiving member, and a spring steel front reinforcing strip arranged in coöperation with said impact receiving members and overlapping the same throughout a substantial distance, said reinforcing strip being formed with holes, connecting bolts having shanks passing through said holes and adjusting holes in both of said impact receiving members through which said connecting bolts pass to adjust the width of said buffer to fit automobiles having frame members at different distances apart and to hold said impact receiving members and said reinforcing strip in close reinforcing coöperation and minimize relative vertical movement thereof.

3. The automobile buffer comprising a pair of flat spring steel strips each having a vertically rigid front impact receiving member, a rearwardly extending attaching member and an intermediate outwardly extending loop member adapted to extend into protective position adjacent the automobile wheel, one of said impact receiving members having its end offset to extend around the end of the other impact receiving member and overlap the same adjacent the center of the buffer, a spring steel strip front reinforcing member adapted to extend across the front of the buffer and formed with holes, and connecting bolts to pass through said holes in said reinforcing member, said impact receiving members being formed with series of holes to be adjustably engaged by said bolts to make said buffer of adjustable width and to hold the overlapping members in vertically rigid and mutually reinforcing coöperation at the front of the buffer.

4. The automobile buffer comprising a pair of flat spring strips each having a vertically rigid front impact receiving member, a rearwardly extending attaching member, one of said impact receiving members having its end offset to extend around the end of the other impact receiving member and overlap the same adjacent the center of the buffer, a spring steel strip front reinforcing member adapted to extend across the front of the buffer and formed with holes, and connecting bolts to pass through said holes in said reinforcing member, said impact receiving members being formed with holes to be adjustably engaged by said bolts to make said buffer of adjustable width and to hold the overlapping members in mutually reinforcing coöperation at the front of the buffer.

5. The automobile buffer comprising two flat resilient strips each having a front impact receiving member, a rearwardly extending attaching member and an intermediate resilient loop member adapted to extend into protective position adjacent the automobile wheel, one of said impact receiving members overlapping the other and having its end offset to extend around the end of the other impact receiving member, a resilient strip front reinforcing member adapted to extend across the front of the buffer throughout a substantial part of the distance and formed with holes, and connecting bolts having shanks to pass through said holes in said reinforcing member, said impact receiving members being formed with series of holes to be adjustably engaged by said bolts to make said buffer of adjustable width and to hold the overlapping members in vertically rigid and mutually reinforcing coöperation at the front of the buffer.

6. The automobile buffer comprising two flat resilient strips each having a front impact receiving member, a rearwardly extending attaching member and an intermediate resilient member, one of said impact receiving members overlapping the other and having its end offset to extend around the end of the other impact receiving member, a resilient strip reinforcing member adapted to extend across the buffer throughout a substantial part of the distance between the frame members of the automobile in contact with said impact receiving members and formed with holes, and connecting bolts having shanks to pass through said holes in said reinforcing member, said impact receiving members being formed with holes to be engaged by said bolts to hold the overlapping members in mutually reinforcing coöperation at the front of the buffer.

7. The automobile buffer comprising two flat resilient strips each having a front impact receiving member, a rearwardly extending attaching member and an intermediate resilient member, one of said impact receiving members overlapping the other, a resilient strip reinforcing member adapted to extend across the buffer throughout a substantial part of the distance between the frame members of the automobile in contact with said impact receiving members and formed with holes and connecting bolts having shanks to pass through said holes in said reinforcing member, said impact receiving members being formed with holes to be adjustably engaged by said bolts to make said buffer of adjustable width and to hold the overlapping members in mutually reinforcing coöperation at the front of the buffer.

8. The automobile buffer comprising a pair of flat spring steel strips each having a front impact receiving member, a rearwardly extending attaching member, one of said impact receiving members overlapping the other, a resilient strip front reinforcing member adapted to extend across the front of the buffer to form triple thickness front portions in connection with said impact receiving members, said reinforcing member being formed with holes, and connecting bolts having shanks to pass through said holes in said reinforcing member, said impact receiving members being formed with holes to be engaged by said bolts to hold the overlapping members in mutually reinforcing coöperation of the front of the buffer.

GEORGE ALBERT LYON.

Witnesses:
 HARRY L. DUNCAN,
 JESSIE B. KAY.